Patented Dec. 24, 1940

2,225,960

UNITED STATES PATENT OFFICE 2,225,960

CONDENSATION PRODUCTS AND A PROCESS OF PREPARING THEM

Ludwig Orthner and Gerhard Balle, Frankfort-on-the-Main, and Karl Horst, Hofheim in Taunus, Germany, assignors to General Aniline & Film Corporation, New York, N. Y., a corporation of Delaware No Drawing. Application January 16, 1940, Serial No. 314,094. In Germany January 27, 1939

8 Claims. (Cl. 260—458)

The present invention relates to condensation products and to a process of preparing them.

We have found that valuable condensation products are obtained by condensing in the presence of alkali a compound or a mixture of compounds containing a sulfamide group obtained by simultaneously treating a saturated aliphatic hydrocarbon with sulfur dioxide and halogen, and causing the product containing sulfur, oxygen and halogen thus obtained to react with ammonia or a primary amine, with organic halogen compounds containing acid salt-forming groups.

The compounds containing sulfamide groups, which are used as parent materials may be prepared from any desired saturated aliphatic hydrocarbons, for instance paraffin hydrocarbons, petroleum hydrocarbons; synthetic hydrocarbons as they are obtained by the reduction of carbon monoxide without application of pressure or at low or medium pressure or by the hydrogenation of carbon at high pressure. If unsaturated hydrocarbons are contained in the mixture, they may be dissolved out of the mixture in the usual manner or may be transformed into saturated hydrocarbons by hydrogenation.

For condensation with the compounds containing sulfamide groups, or with mixtures of such compounds there may be used as organic halogen compounds containing acid salt-forming groups the following bodies: halogencarboxylic acids, for instance, chloroacetic acid, beta-chloropropionic acid, alpha-chlorobutyric acid, gamma-chlorobutyric acid, alpha-bromolauric acid, omega-bromoundecanic acid, chloromethylbenzoic acid, chloromethylphenoxyacetic acid, bromo-succinic acid; halogensulfonic acids or halogensulfuric acid esters such as bromoethanesulfonic acid, gamma-chloro-beta-hydroxypropanesulfonic acid, benzylchloride-para-sulfonic acid, beta-chloro- or beta-bromoethanolsulfuric acid esters, chloronitrobenzoic acid, chloroethylhydroxyethanesulfonic acid.

The reaction may likewise first be performed with halogen hydrines of polyhydric alcohols such as ethylenechlorohydrin, glycerine chlorohydrin, monochlorohydrin of polyglycolethers or of polyglycerines and the hydroxy compounds thus obtained may then be reacted with polybasic inorganic acids. The organic halogen compounds containing acid salt-forming groups are used suitably in the form of their alkali salts or their esters. In the latter case, ester-like condensation products are obtained from which there may be prepared by saponification the free acids or the alkali salts thereof.

The reactions are generally carried out so that the compounds containing sulfamide groups are dissolved or dispersed or made into a paste by means of water with the addition of, for instance, the equivalent amount of caustic soda or caustic potash and then caused to react with the compounds to be used for the condensation. The reaction may also be performed by simultaneously and progressively adding to the reaction mass the second component for the reaction and caustic alkali; the reaction occurs with formation of the corresponding amount of inorganic alkali salts. The reaction may, if desired, be carried out with entire exclusion of water or in the presence of an indifferent solvent or diluent.

The new products have capillary active properties and may be used above all in the textile industry as wetting, foaming, dispersing and cleansing agents. They may be used alone or in admixture with each other and also in admixture with other products used in the textile industry for the said purposes, for instance, with soaps, with ordinary soap substitutes, with soap substitutes which are stable to the hardness of water, with solvents, with mucilages or the like. The usual additions may be made, which serve, for instance, for rendering innocuous the salts which cause the hardness of water; such additions are salts of phosphoric acids containing less water than ortho-phosphoric acid contains and salts of nitrilo-triacetic acid. Furthermore, there may be added bleaching agents, for instance perborate, persulfate, percarbonate, as well as stabilizing agents for the last-mentioned products.

The following examples serve to illustrate the invention, but they are not intended to limit it thereto; the parts are by weight:

1. 305 parts of hexadecanesulfonamide are mixed in a vessel, provided with a stirrer, with 250 parts of caustic soda solution of 32 per cent strength to form a homogeneous mass, and then 350 parts of the sodium salt of chloroacetic acid of 65 per cent strength are introduced, while vigorously stirring. By slowly heating reaction sets in; the temperature is preferably maintained below 95° C. in order to avoid a too strong forming of the mass. The sodium chloracetate may also be introduced when the mixture of hexadecanesulfonamide and caustic soda solution has attained a temperature of about 90° C. and in this case the salt is introduced into the mass so that the reaction temperature does not essentially exceed 100° C. Stirring of the mass is preferably continued for about 1 hour at 100° C.; when it has finally become viscous it is introduced into water and the sodium salt of hexadecanesulfonamidoacetic acid so obtained

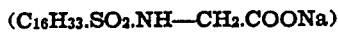
(C₁₆H₃₃.SO₂.NH—CH₂.COONa)

is salted out by means of sodium chloride, or by addition of a mineral acid the crude sulfamidoacetic acid is precipitated in a water-insoluble form. In order to free the product from any admixed hexadecanesulfonamide it is introduced into sodium carbonate solution wherein the sulfonamide is not soluble. Admixed hydrocarbons may be removed simultaneously by dissolving in dilute hot alkaline solution (with caustic alkali or alkali carbonate) such hydrocarbons remained in the parent material after the production of the sulfochloride or were used for diluting the mass during the reaction with chloracetic acid herein described. The hexadecanesulfonamidoacetic acid dissolves rather readily in ether, benzine, benzene and alcohol. The alkali salts foam rather strongly in aqueous solutions and have a good washing effect.

The hexadecanesulfamide used as parent material is prepared in the following manner: Equal amounts of chlorine and sulfurdioxide are simultaneously introduced into 226 parts of hexadecane, while exposing the reaction mass to ultraviolet rays and keeping it in constant motion by stirring. After the weight of the mass has increased by 100 parts, no further gas is introduced and any gas perhaps dissolved is removed from the mass under reduced pressure.

Thereupon, 500 grams of ether are introduced into a stirring vessel capable of being cooled, and a strong current of ammonia is passed through the ether, while stirring. While constantly passing ammonia through the vessel, 324 parts of hexadecanesulfochloride prepared as above described are added drop by drop so that the reaction temperature is kept at between 5° C. and 7° C. After the desired quantity of sulfochloride has been added, the mass is stirred for 3 to 4 hours at 15° C. to 20° C. while likewise causing ammonia to pass through the vessel. After cooling, the ammonium chloride formed is separated by filtration and the solvent is removed by distillation. About 305 parts of an oily mixture of hexadecanesulfamides partly solidifying to form crystals on prolonged standing are obtained.

2. 300 parts of methylsulfonamides

R.SO₂.NH.CH₃ obtained by treating with chlorine and sulfurdioxide and subsequently reacting with methylamine a saturated hydrocarbon fraction boiling at 200° C. to 350° C. obtained in the preparation of benzine by reduction of carbon monoxide and subsequent hydrogenation, are mixed with 160 parts of beta-chloropropionic acid. While stirring and simultaneously heating the mass to 50° C. to 90° C. there are gradually run in 200 parts of caustic soda solution of 30 per cent strength. The crude alkyl-sulfomethylamido-beta-propionic acid formed is worked up from the mass in a manner similar to that described in Example 1.

3. 500 parts of a mixture of paraffin sulfomethylamides, obtained from hard paraffin by simultaneously treating it with chlorine and sulfurdioxide and subsequently causing the reaction product to react with methylamine, are intimately kneaded, at 90° C., together with 200 parts of chloroacetic acid. While further kneading the mass, 200 parts of caustic soda solution of 50 per cent strength are run in. In order to mix the components better there may be added or admixed to the hard paraffin sulfomethylamide the same weight of an aliphatic hydrocarbon mixture boiling at 150° C. to 200° C. The sulfonamido acetic acid formed is purified by dissolving it in hot sodium carbonate solution and reprecipitating it with mineral acid.

4. 128 parts of a completely saturated benzine-fraction boiling at about 50° C.–150° C. (prepared by reduction of carbon monoxide) are transformed into a mixture of compounds containing chlorine, sulfur and oxygen by simultaneously introducing chlorine and sulfurdioxide while exposing the mixture to the light of a mercury vapor lamp. From the product there are obtained by the action of liquid ammonia about 200 parts of a mixture of alkylsulfamides the alkyl radicals of which contain about 6 to 12 carbon atoms.

200 parts of this alkylsulfamide mixture are mixed in a kneading machine with 200 parts of caustic soda solution of 40 per cent strength whereby the alkylsulfamide mixture dissolves. Thereupon 320 parts of sodium bromacetate are introduced and the mass is heated to about 60° C.–80° C. After one hour the reaction is complete. The sodium salts of the alkylsulfamidoacetic acids formed are isolated as described in Example 1.

5. A saturated hydrocarbon-fraction from Pennsylvanian petroleum boiling within the range 250° C. and 350° C. and having an average molecular weight of 210 is treated, simultaneously with chlorine and sulfur dioxide in such a manner that about half of the hydrocarbons used remains unaltered. The mixture is then treated with a solution of methylamine in ether and methylamine is permanently passed through the mixture. When the reaction is finished the product is filtered from the precipitated methylamine hydrochloride and the ether is distilled.

500 parts of the alkylsulfomethylamide obtained are mixed with 200 parts of caustic soda solution containing 40 per cent of NaOH to form a homogeneous mass. 320 parts of sodium beta-bromethanesulfonate are added. The mixture is heated at 100° C. to 110° C. while stirring continuously for about 6 hours. When the reaction is terminated the mass is made up with water to 4200 parts. It is allowed to stand whereby at 60° C.–70° C. about 200 parts of unchanged hydrocarbon separate. The salt solution containing the mixture formed of sodium salts of alkylsulfomethylamino-ethanesulfonic acids is evaporated to dryness. A solid pulverizable mass is obtained containing about 50 per cent of the said sodium salts.

6. A saturated hydrocarbon-fraction boiling within the range 240° C. to 340° C. prepared by the reduction of carbon monoxide is treated simultaneously with chlorine and sulfur dioxide so that a mixture of compounds is obtained containing per mol of the hydrocarbon used about 1 atom of chlorine and 1 atom of sulfur as well as 2 atoms of oxygen. By treating this product with liquid ammonia a mixture of alkylsulfamides having an average molecular weight of about 280, is obtained.

280 parts of these sulfamides are worked up with 160 parts of caustic soda solution of 50 per cent. strength to form a homogeneous mass. 350 parts of sodium sulfonate of para-benzyl chloride are added and the mass is heated, while permanently mixing, for about 4-6 hours at 70° C. to 90° C. After neutralization the mass is dried. A mixture is obtained containing about 66 per cent. of the sodium salts of the alkylsulfo-para-sulfobenzylamides formed.

7. 305 parts of the mixture of hexadecanesulfamides described in Example 1 are dissolved with 460 parts of 2-n-caustic soda solution. 200 parts of the sodium salt of the chloroethanol-sulfuric acid ester are introduced at room temperature into the solution, while stirring, and the mass is slowly heated to the temperature of the water bath. The reaction is complete after about 2-3 hours. The mass is neutralized with dilute hydrochloric acid and made up with water to 1300 parts. The paste-like mass is the solution of 35 per cent. strength of the mixture of sodium salts of hexadecanesulfamido-ethanolsulfuric acid esters.

8. 305 parts of hexadecanesulfamides are dissolved as described in the preceding example in 460 parts of 2-n-caustic soda solution. 100 parts of ethylene-chlorhydrine are introduced, while stirring, into the solution heated on the water bath. After the whole has been heated for 2-3 hours a feebly yellow oil has separated. This oil is washed with a sodium sulfate solution of 10 per cent. strength and freed from water by heating it to about 100° C. under reduced pressure. 350 parts of the hexadecanesulfoethanolamides obtained are dissolved in 350 parts of methylene chloride and the solution is gradually mixed at 10° C. to 15° C. with 130 to 140 parts of chlorosulfonic acid. The whole is stirred for further 2 to 3 hours at 10° C. to 15° C. and the sulfonation mass is caused to run at 10° C. to 15° C. into 200 parts by volume of 5-n-caustic soda solution. During this operation the mass is kept in the alkaline condition for instance by the further addition of caustic soda solution. The mass is then neutralized and the product is evaporated to dryness. There are obtained 450 parts of a solid product which dissolves in water to a clear solution and which is identical with the product obtained according to Example 7.

9. 327 parts of a mixture of aliphatic N-oxethylsulfamides, prepared from a mixture of hydrocarbons boiling within the range 240° C. to 340° C. and having an average molecular weight of 200 by the simultaneous action of chlorine and sulfur dioxide while exposing the mixture to the action of active light and then causing it to react with ethanolamine, are heated to boiling with 1000 parts by volume of normal potassium ethylate solution in ethyl alcohol and the alcohol is distilled up to about 300 parts by volume. 250 parts of chloroethylglucoside are added and the mixture is stirred for several hours on the water bath. The product is filtered with suction from the precipitated potassium chloride and the alcohol is distilled. 500 parts of a viscous oily product are obtained.

This product is mixed, while cooling, at about 20° C. to 25° C. with 100 parts of concentrated sulfuric acid. After stirring for a short time at 20° C. to 25° C. a water-soluble product is obtained. 100 parts of ice are introduced, while stirring and the acid solution is rendered quite feebly alkaline with caustic soda solution at about 15° C.-20° C. It is then evaporated to dryness. There is obtained a viscous mass which solidifies on standing for a prolonged time. Its solution has a very good foaming power.

10. 324 parts of the hexadecane-sulfochloride described in Example 1 are transformed with aniline into a mixture of hexadecane-sulfanilides. 380 parts of hexadecane-sulfanilides are mixed in a toluene solution with 40 parts of sodium amide and the mixture is kept gently boiling until ammonia no longer escapes. 120 parts of glycerin-alpha-chlorhydrine are then added and the mixture is further heated to boiling. After 3-4 hours the product is filtered from the precipitated sodium chloride and the toluene is removed by distillation. The product is diluted with the same quantity of ether. 120 parts of chlorosulfonic acid are then added, drop by drop, at 10° C.-15° C. and the whole is stirred for 2 hours at 10° C. to 15° C. 500 parts of ice are then added, while stirring, the solution is neutralized at 15° C.-20° C. with caustic soda solution and evaporated to dryness. There are obtained 560 parts of a slowly solidifying, substantially colorless product which is soluble in water.

We claim:

1. The process which comprises reacting compounds of the formula $R-SO_2-NHR_1$ wherein $R-SO_2$ is the radical of a sulfonic acid halogenide obtained by simultaneously treating a saturated aliphatic hydrocarbon with sulfur dioxide and halogen, and $R_1$ stands for a member of the group consisting of hydrogen, hydrocarbon radicals and aliphatic hydrocarbon radical containing hydroxy groups, with organic halogen compounds containing acid salt-forming groups.

2. The process which comprises reacting compounds of the formula $R-SO_2-NHR_1$ wherein $R-SO_2$ is the radical of a sulfonic acid halogenide obtained by simultaneously treating a saturated aliphatic hydrocarbon with sulfur dioxide and halogen, and $R_1$ stands for a member of the group consisting of hydrogen, hydrocarbon radicals and aliphatic hydrocarbon radicals containing hydroxy groups, with organic halogen compounds containing carboxylic groups.

3. The process which comprises reacting compounds of the formula $R-SO_2-NHR_1$ wherein $R-SO_2$ is the radical of a sulfonic acid halogenide obtained by simultaneously treating a saturated aliphatic hydrocarbon with sulfur dioxide and halogen, and $R_1$ stands for a member of the group consisting of hydrogen, hydrocarbon radicals and aliphatic hydrocarbon radicals containing hydroxy groups, with organic halogen compounds containing sulfonic acid groups.

4. The process which comprises reacting compounds of the formula $R-SO_2-NHR_1$ wherein $R-SO_2$ is the radical of a sulfonic acid halogenide obtained by simultaneously treating a saturated aliphatic hydrocarbon with sulfur dioxide and halogen and $R_1$ stands for a member of the group consisting of hydrogen, hydrocarbon radicals and aliphatic hydrocarbon radicals containing hydroxy groups, with organic halogen compounds containing acid sulfuric acid ester groups.

5. As new products the compounds of the formula

wherein $R-SO_2$ is the radical of a sulfonic acid halogenide obtained by simultaneously treating a saturated aliphatic hydrocarbon with sulfur dioxide and halogen, $R_1$ stands for a member of the group consisting of hydrogen, hydrocarbon radicals and aliphatic hydrocarbon radicals containing hydroxy groups, $R_2$ stands for an organic radical and X means an acid salt-forming group.

6. As new products the compounds of the formula $$R-SO_2-\underset{\underset{R_1}{|}}{N}-R_2-X$$

wherein R—SO$_2$ is the radical of a sulfonic acid halogenide obtained by simultaneously treating a saturated aliphatic hydrocarbon with sulfur dioxide and halogen, R$_1$ stands for a member of the group consisting of hydrogen, hydrocarbon radicals and aliphatic hydrocarbon radicals containing hydroxy groups, R$_2$ stands for an organic radical and X stands for the carboxylic acid group.

7. As new products the compounds of the formula $$R-SO_2-\underset{\underset{R_1}{|}}{N}-R_2-X$$

wherein R—SO$_2$ is the radical of a sulfonic acid halogenide obtained by simultaneously treating a saturated aliphatic hydrocarbon with sulfur dioxide and halogen, R$_1$ stands for a member of the group consisting of hydrogen, hydrocarbon radicals and aliphatic hydrocarbon radicals containing hydroxy groups, R$_2$ stands for an organic radical and X stands for the sulfonic acid group.

8. As new products the compounds of the formula $$R-SO_2-\underset{\underset{R_1}{|}}{N}-R_2-X$$

wherein R—SO$_2$ is the radical of a sulfonic acid halogenide obtained by simultaneously treating a saturated aliphatic hydrocarbon with sulfur dioxide and halogen, R$_1$ stands for a member of the group consisting of hydrogen, hydrocarbon radicals and aliphatic hydrocarbon radicals containing hydroxy groups, R$_2$ stands for an organic radical and X stands for the acid sulfuric acid ester group.

LUDWIG ORTHNER.
GERHARD BALLE.
KARL HORST.